United States Patent
Ten et al.

(10) Patent No.: US 7,453,928 B2
(45) Date of Patent: Nov. 18, 2008

(54) DATA TRANSMISSION DEVICE

(75) Inventors: Ming-Chou Ten, Taiwan (TW); Chun-Wang Wei, Hsin Chu (TW); Kun-Ying Tsai, Hsin Chu (TW); Jui-Tai Ko, Hsin Chu (TW)

(73) Assignee: RDC Semiconductor Co., Ltd. (TW)

( * ) Notice: Subject to any disclaimer, the term of this patent is extended or adjusted under 35 U.S.C. 154(b) by 620 days.

(21) Appl. No.: 11/270,223

(22) Filed: Nov. 8, 2005

(65) Prior Publication Data

US 2006/0188037 A1 Aug. 24, 2006

(30) Foreign Application Priority Data

Feb. 5, 2005 (TW) .............................. 94103971 A

(51) Int. Cl.
*H04B 1/38* (2006.01)
(52) U.S. Cl. ...................................... 375/219; 341/144
(58) Field of Classification Search ................. 375/220, 375/219, 257; 341/144
See application file for complete search history.

(56) References Cited

U.S. PATENT DOCUMENTS

| | | | |
|---|---|---|---|
| 6,185,263 B1 | 2/2001 | Chan | |
| 6,703,865 B2 | 3/2004 | Chan | |
| 7,280,060 B1 * | 10/2007 | Sutardja et al. | 341/144 |
| 2004/0105504 A1 * | 6/2004 | Chan | 375/257 |
| 2005/0135413 A1 * | 6/2005 | Yang et al. | 370/463 |

* cited by examiner

*Primary Examiner*—Kevin Y Kim
(74) *Attorney, Agent, or Firm*—Peter F. Corless; Steven M. Jensen; Edwards Angell Palmer & Dodge LLP

(57) ABSTRACT

A data transmission device is applied to a network apparatus having an automatic crossover function, and is connected to a transmission control unit, such that the transmission control unit detects an operating status of the network apparatus and accordingly generates a control command. Thereby, a current source generating unit provides current sources to a first-mode converting unit and a second-mode converting unit according to the control command. This allows a suitable data transmission processing mode to be selected automatically and instantaneously for the operating status of the network apparatus by the current sources from the current source generating unit and the control command generated from the transmission control unit, so as to achieve power saving, low distortion and/or anti-interference.

13 Claims, 8 Drawing Sheets

DATA TRANSMISSION DEVICE

FIELD OF THE INVENTION

The present invention relates to data transmission devices, and more particularly, to a data transmission device applicable to network apparatus having an automatic crossover function that can be automatically switched to a required data transmission mode instantaneously according to an operating status of the network apparatus, thereby achieving power saving, low distortion and/or anti-interference effects.

BACKGROUND OF THE INVENTION

PCs (personal computers), workstations and servers can be connected to network through LANs (Local Area Networks). The initial form of Ethernet was 10Base-T, which still has main network technologies of LANs. However, 10Base-T Ethernet can no longer satisfy the needs of network transmission, due to the rising of a variety of network applications and increased data traffic, especially the rising of multimedia data with immense bandwidth requirements, such as voice, images and video. These requirements had thus propelled the generation of Fast Ethernet, i.e. 100 Base-T.

However, in the recent years, due to the expansion of the scale of the network and the wide spreads of network interconnections and network applications like VoD (Voice on Demand) and data centres, 10Base-T again failed to satisfy the increasing demands of the new network applications, thus Gigabit Ethernet (1000Base-T) is generated. Gigabit Ethernet provides a bandwidth of one gigabits per second at a lower cost in a simpler Ethernet architecture, and also smooth transitions from 10Base-T and 100Base-T Ethernet devices.

Irrespective of how network connections are implemented, Ethernet transceivers are now widely used in numerous types of electronic devices, such as PCs, desktop computers or apparatuses in network layout within companies. Since there are many types of devices employed, conflicts and limitations often occur in the I/O mode of an Ethernet circuit. For example, in the network layout of a company, the density of transceivers is usually high, thus electromagnetic interference (EMI) between these devices has become a major concern, in addition to maintaining bandwidth and signal quality by, minimizing crosstalks and other external noise sources.

On the contrary, at places where electronic devices are scattered, EMI becomes a secondary concern. Instead power consumption by the Ethernet transceivers of notebook computers becomes an important issue. For electronic devices in which battery life is limited, components therein have to operate at minimum possible power consumptions to perform satisfactorily.

When a differential signal transmitter (e.g. an Ethernet transmitter) is in a Class A mode, a change of a differential current defines a differential signal. Since a common-mode current component is always kept at constant, the EMI and distortion are reduced when transmitting a differential signal. However, as the common-mode current is constant, even if the differential mode signal is zero, the constant common-mode current forces the circuit to conduct a constant amount of current at any time. This means a current mode transmitter that outputs a constant common-mode current inevitably consumes a considerable amount of power.

In order to reduce constant currents and in turns reducing power consumption, differential signal system has to be operated under a Class B mode. In the Class B mode, the common-mode current varies between zero and a maximum. However, the varying common-mode current results in severe EMI and distortion, which is to be avoided in areas populated with a high density of electronic devices.

In order to solve the problems above, U.S. Pat. No. 6,185,263 has proposed a digital-to-analog converter (DAC) employing both Class A/Class B modes to control the EMI and power consumption. As shown in FIG. 1(A), a differential-signal transmitting end (transmitter) generates control signals (a, b, c, and d) via Class A/Class B selection logic circuitry to control a line driver array, wherein the line driver array is consisted of a plurality of line driver cells. Each line driver cell outputs a specific amount of current. The Class A/Class B selection logic circuitry generates the control signals to control each line driver cell for operating in a Class A mode or Class B mode. The number of disabled line driver cells is also controlled by the selection logic circuitry in order to conform to different voltage swings required by different transmission standards.

Although this invention solves the problems in the prior art, the Class A/Class B selection logic circuitry consists of a plurality of Class A/Class B control circuits, where each Class A/Class B control circuit comprises a Class A logic circuit and Class B logic circuit. Each logic circuits generates a set of control signals (a, b, c, and d) and one of the sets of the control signals is selected via a 2:1 multiplexer (MUX) to control a line driver cell to operate in the Class A or B mode. Since the Class A/Class B control circuit is configured with the Class A and B logic circuits to form a mixed Class A/Class B control circuit, this greatly restricts the flexibility in circuit modifications. Additionally, the Class A and Class B logic circuits are simultaneously in operation, thus it is more power consuming.

Moreover, each line driver cell of the differential-signal transmitting end outputs a particular amount of current. When the output voltage is large (e.g. 2.5 V output voltage for 10Base-T Ethernet), then the required output current is accordingly large. Thus, the transmitting end requires more line driver cells to form the line driver array in order to satisfy a output voltage swing required by a certain transmission standard (e.g. 10Base-T transmission standard). This increases the design cost and complexity.

In addition, differential signal transmitters are currently applied to network apparatus, and one of two pairs of transmission lines is selected via a line driver, so as to output signals to the network via the selected transmission line. U.S. Pat. No. 6,703,865 discloses a line driver that drives a first or second transmission line according to a control signal. The architecture of this line driver is shown in FIG. 1(B). A differential amplifier 10 of the line driver is connected to a first differential switch 12 and a second differential switch 14, which are controlled by a first control signal 120 and a second control signal 140, respectively. The outputs of the first and second differential switches 12 and 14 are connected to a first transmission line 17 and a second transmission line 18, respectively, via a media interface 16.

The differential amplifier 10 includes FETs (field effect transistors) 100, 102, and 104. FET 100 provides an bias current I for FETs 102 and 104. The gates of FETs 102 and 104 are controlled respectively by a first component 190 and a second component 192 of a differential input signal. The FETs 102 and 104 amplify the differential input signal according to the bias current I to generate a differential output signal (having components 200 and 202, which are provided to the first and second differential switches 12 and 14, respectively). Then one of the first and second differential switches 12 and 14 is turned ON by the first and second control signals 120 and 140, so that the differential output signal can be sent to a network via the conducting differential switch, the media interface 16 and one of the first and second transmission lines 17 and 18.

However, the bias current I has to go through the two-stages FETs in order to be outputted, thus resulting in a large amount of current I loss and deteriorates the signal quality, and also making it difficult to operate under low voltage supply.

Hence, there is a need for a data transmission device that can be applied to network apparatus having an automatic crossover function (MDI/MDIX) and provides lower power consumption, anti-interference and reliable signal transmission according to an operating status of the network apparatus.

SUMMARY OF THE INVENTION

In light of the above drawbacks, the primary objective of the present invention is to provide a data transmission device with an automatic crossover function (MDI/MDIX) that can be applied to a network apparatus to automatically and instantaneously select a suitable operating mode according to current sources and control signals and also provide lower power consumption and anti-EMI according to the operating status of the network apparatus.

Another objective of the present invention is to provide a data transmission device applied to a network apparatus having an automatic crossover function to avoid higher transmission signal loss in the prior art.

Yet another objective of the present invention is to provide a data transmission device to achieve low cost and simple design.

In order to achieve the above and other objectives, the present invention discloses a data transmission device applied to a network apparatus having an automatic crossover function and connected with a transmission control unit, such that the transmission control unit detects an operating status of the network apparatus and generates a control command to the data transmission device. The data transmission device comprises a signal adjusting unit for processing a digital data to be transmitted to generate a digital signal compatible with a transmission standard adopted by the network apparatus; a current source generating unit for outputting first current sources and second current sources compatible with the transmission standard adopted by the network apparatus according to the control command generated by the transmission control unit; a first-mode converting unit for converting the digital signal generated by the signal adjusting unit into a first analog signal according to the control command and the first current sources; a second-mode converting unit for converting the digital signal generated by the signal adjusting unit into a second analog signal according to the control command and the second current sources; and a summing unit for summing up the first analog signal and the second analog signal to generate a third analog signal representing the digital data to be transmitted and transmitted via a network medium to a remote end.

The data transmission device further comprises a line interface for selecting a transmission medium compatible with the configuration adopted by the network apparatus based on the automatic crossover function of the network apparatus, thereby transmitting the third analog signal to the remote end via the transmission medium.

The first mode is a Class A mode in which the common-mode output signals are constant; the second mode is a Class B mode in which the common-mode output signals are variable.

The data transmission device automatically and instantaneously selects an appropriate operating mode (Class A and/or Class B) based on the control command from the transmission control unit, and also automatically and instantaneously selects an appropriate operating mode based on the current sources (first and second current sources) generated by the current source generating unit, thereby it is able to achieve power saving and anti-EMI according to the operating status of the network apparatus detected by the transmission control unit.

Additionally, the current source generating unit in the data transmission device of the present invention is able to make the first and second current sources generate appropriate currents to satisfy different output voltage swings for different transmission standards adopted by the network apparatus, thereby eliminating the problems of increased design cost and complexity and reduced design flexibility due to having to add extra line driver cells to accommodate for larger output voltage.

Furthermore, each of the first-mode and the second-mode converting unit in the data transmission device of the present invention comprises a plurality of current transmitting units (also called line driver cells). Each of these current transmitting units is constituted by a one-stage FET, thus eliminating the problems of signal losses brought by the two-stage FETs constituting the current transmitting units in the prior art.

BRIEF DESCRIPTION OF THE DRAWINGS

FIG. 1 (B) is an internal circuit diagram of a line driver in a U.S. Pat. No. 6,703,865;

FIG. 3 (B) shows a schematic internal circuit diagram of a first-mode converting unit shown in FIG. 2;

FIG. 3 (C) shows a schematic internal circuit diagram of a second-mode converting unit shown in FIG. 2;

PREFERRED EMBODIMENTS OF THE INVENTION

Figure 1A:
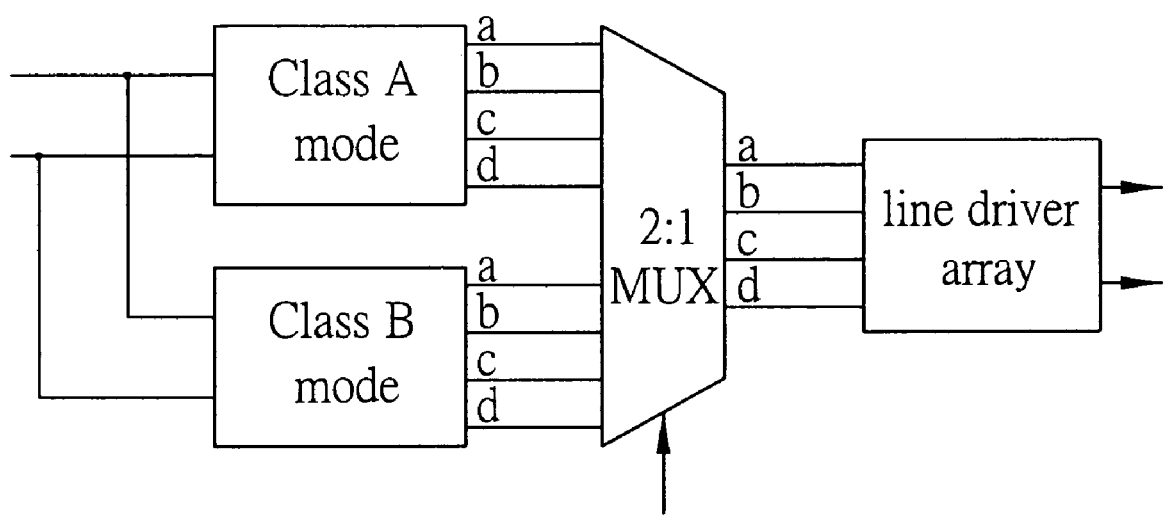
FIG. 1 (A) is a basic block diagram of a Class A/Class B mode switching circuit in a U.S. Pat. No. 6,185,263.
Figure 1B:
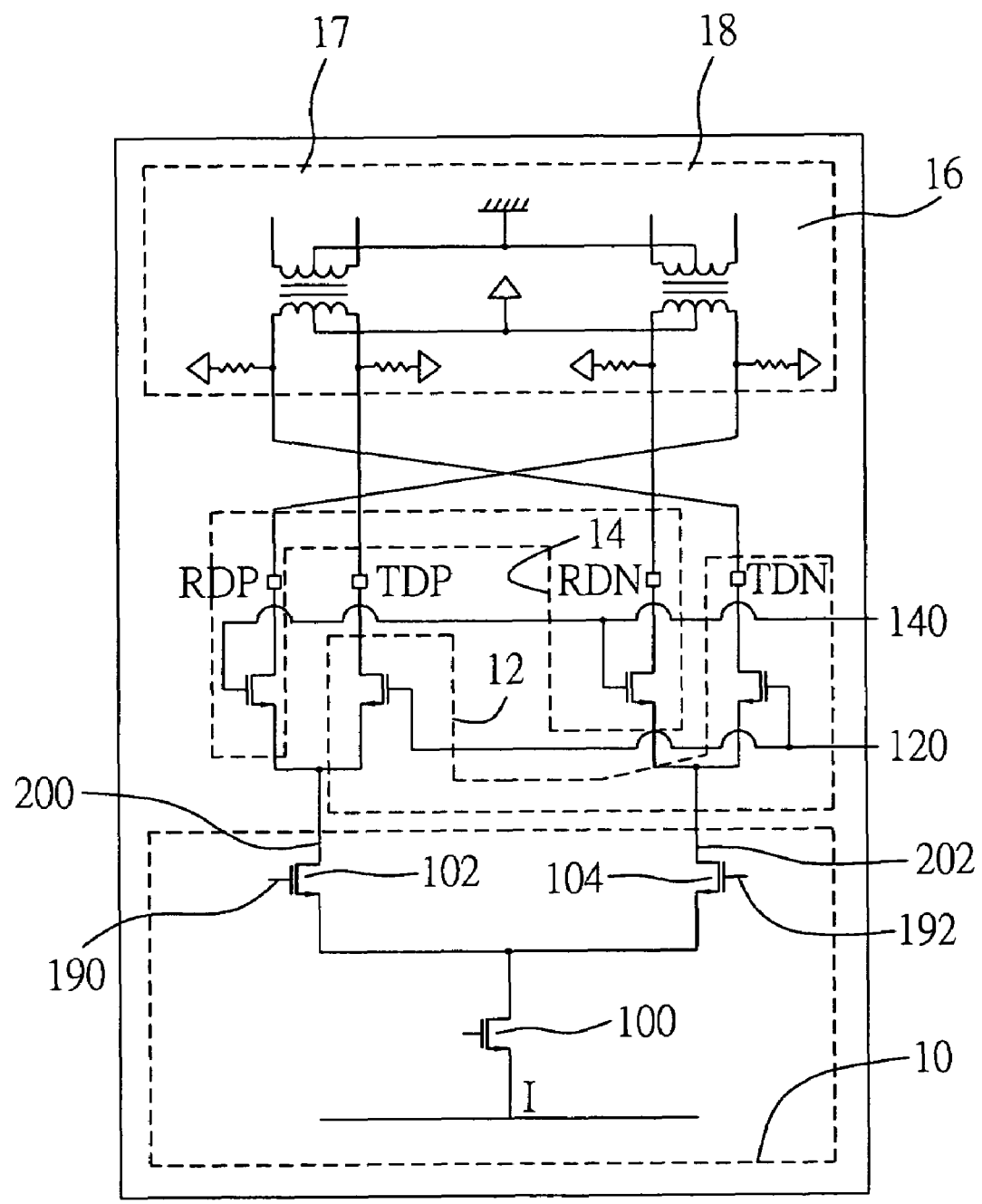
Figure 2:
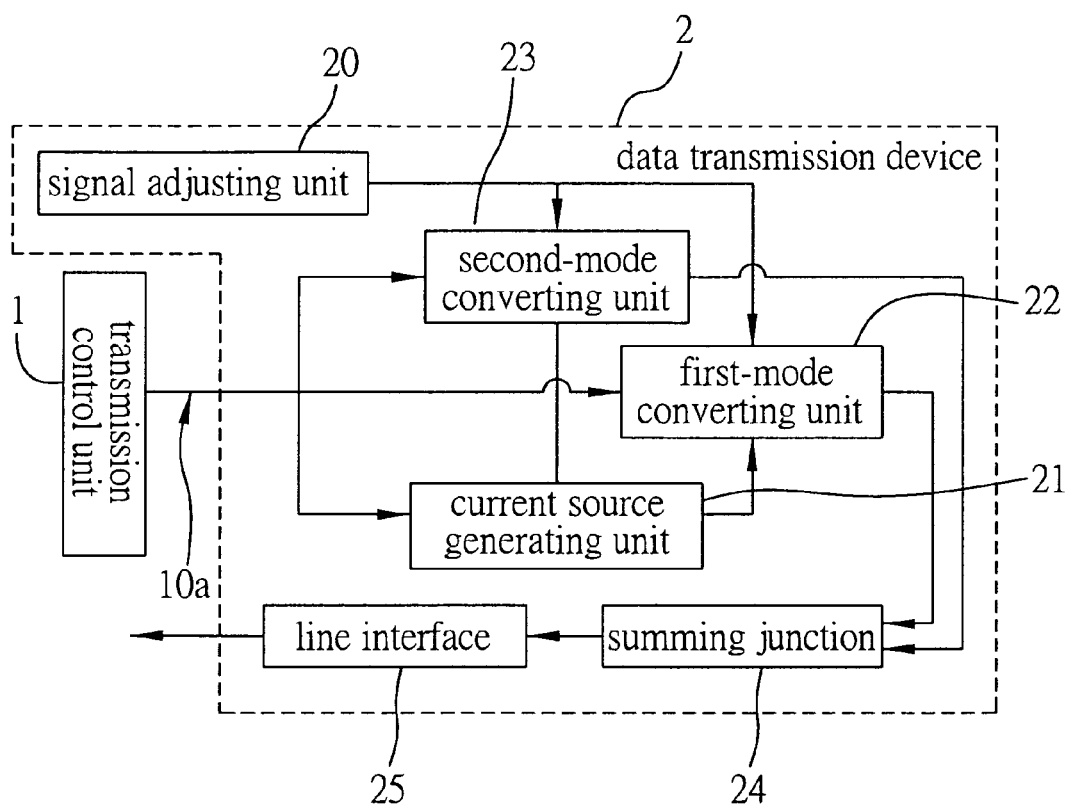
FIG. 2 is a basic schematic diagram of a data transmission device of the present invention applied to a network apparatus having an automatic crossover function.

FIG. 2 shows a basic schematic structure for a data transmission device applied to a network apparatus having an automatic crossover function (Medium Dependent Interface/Medium Dependent Interface-crossed; MDI/MDIX) according to the present invention. The data transmission device 2 is connected to a transmission control unit 1, such that the transmission control unit 1 detects an operating status of the network apparatus and in response generates a control command 10*a*. The transmission control unit 1 is a transmission control logic circuitry.

As shown in FIG. 2, the data transmission device 2 comprises a signal adjusting unit 20, a current source generating unit 21, a first-mode converting unit 22, a second-mode converting unit 23, a summing junction 24 and a line interface 25. The data transmission device 2 is described further as follows.

The signal adjusting unit 20 adjusts digital data to be transmitted to comply with the transmission standard employed by the network apparatus. The signal adjusting unit 20 is a pulse shaping logic circuit. However, the signal adjusting unit 20 is not limited to this, but can be other electronic components or circuits with the same or similar functions depending on the applications. The transmission standard is a 10Base-T (10 MHz baseband transmission) standard, a 1000Base-T standard (100 MHz baseband transmission) or a 1000Base-T (1000 MHz baseband transmission) standard.

The current source generating unit 21 generates current sources Ia and Ib that comply with the transmission standard of the network apparatus according to the control command 10a from the transmission control unit 1. The current source generating unit 21 is a variable current source generator, the internal structure of which will be described later with FIG. 3A. The current source generator unit 21 can be a constant current source generator depending on the applications.

The first-mode converting unit 22 converts the digital signal to a first analog signal according to the control command 10a of the transmission control unit 1 and the current source Ia generated by the current source generating unit 21. The first-mode converting unit 22 is a Class A mode, M-bit DAC (Digital-to-Analog Converter) with constant common-mode output current. Generally, the common-mode output current of the Class A mode is constant, even if the differential-mode output current is zero, the internal circuit still conducts and has a common-mode output current, which creates power consumption. Therefore, the data transmission device 2 of the present invention is developed and the second-mode converting unit 23 is designed to process Class B circuits, solving the power consumption problem. The internal circuit structure of the first-mode converting unit 22 will be described with reference to FIG. 3(B).

The second-mode converting unit 23 converts the digital signal to a second analog signal according to the control command 10a of the transmission control unit 1 second-mode converting unit 23 is a Class B mode, N-bit DAC with variable common-mode output signal. Generally, the common-mode output current of the Class B mode is variable, so the power consumption problem is avoided. However, the EMI and distortion problems are more severe for variable common-mode output current. Therefore, the data transmission device 2 of the present invention is developed and the first-mode converting unit 22 is designed to process Class A circuits, solving the EMI and distortion problem. The internal circuit structure of the second-mode converting unit 23 will be described with reference to FIG. 3(C).

The summing junction 24 sums up the first analog signal and the second analog signal to generate a third analog signal representing the digital data to be transmitted.

The line interface 25 is used to select a transmission medium compatible with the configuration employed by the network apparatus according to the automatic crossover function (MDI/MDIX) of the network apparatus, such that the third analog signal generated by the summing junction 24 can be transmitted to a remote end. The configuration of the network apparatus is for example a node-mode or a hub-mode configuration. The transmission medium is a non-shielded twisted pair or other suitable medium corresponding to the above transmission standard.

It should be noted that the control command 10a of the transmission control unit 1 includes a two-bit control command and a multi-bit control command. These control commands are generated by the transmission control unit 1 (e.g. said transmitting control logic circuitry) according to the current operating status (power saving/anti-EMI requirements) of the network apparatus. The two-bit control command is one set of the 00, 01, 10, 11 binary values, and the status of the two-bit control command (00, 01, 10 or 11) depends on the operating status of the network apparatus. The multi-bit control command is a multi-bits digit symbol consisting of binary 0 and 1, and the status of the multi-bits control command depends on the type of transmission standard adopted by the network apparatus. In this embodiment, the current operating status of the network apparatus can be implemented by a firmware driver via a register. However, this kind of technology is well known in the art and therefore will not be further described.

The two-bit control command is used to control the first- and second-mode converting unit 22 and 23. For example, when the two-bit control command has the value of 00, both the first-mode and second-mode converting units 22 and 23 are in a disable mode. Under such mode, the data transmission device 2 will not transmit any data to the remote end. When the two-bit control command value is 01, the first-mode converting unit 22 is disabled and the second-mode converting unit 23 is enabled, such that the network apparatus uses the second-mode converting unit 23 to perform conversion on data to be transmitted. When the two-bit control command value is 10, the first-mode converting unit 22 is enabled and the second-mode converting unit 23 is disabled, such that the network apparatus uses the first-mode converting unit 22 to perform conversion on data to be transmitted. When the two-bit control command value is 11, both the first- the second-mode converting units 22 and 23 are enabled, such that the network apparatus uses both the first-mode and second-mode converting units 22 and 23 to perform conversion on data to be transmitted.

Moreover, the data conversion mode suitable for the network operating status can be selected through the current source generating unit 21 by generating current sources Ia and Ib according to the transmission standard adopted by the network apparatus. For example, the current source generating unit 21 may generate appropriate current sources Ia and Ib according to the multi-bit control command of the transmission control unit 1. The magnitudes of these current sources Ia and Ib can be adjusted by the current source generating unit 21 based on the status value of the multi-bit control command, or one or both of the current sources Ia and Ib can even be made zero based on the status value of the multi-bit control command. This achieves the effect of selecting a proper data conversion mode to meet the requirements of current operating status of the network apparatus.

Figure 3A:
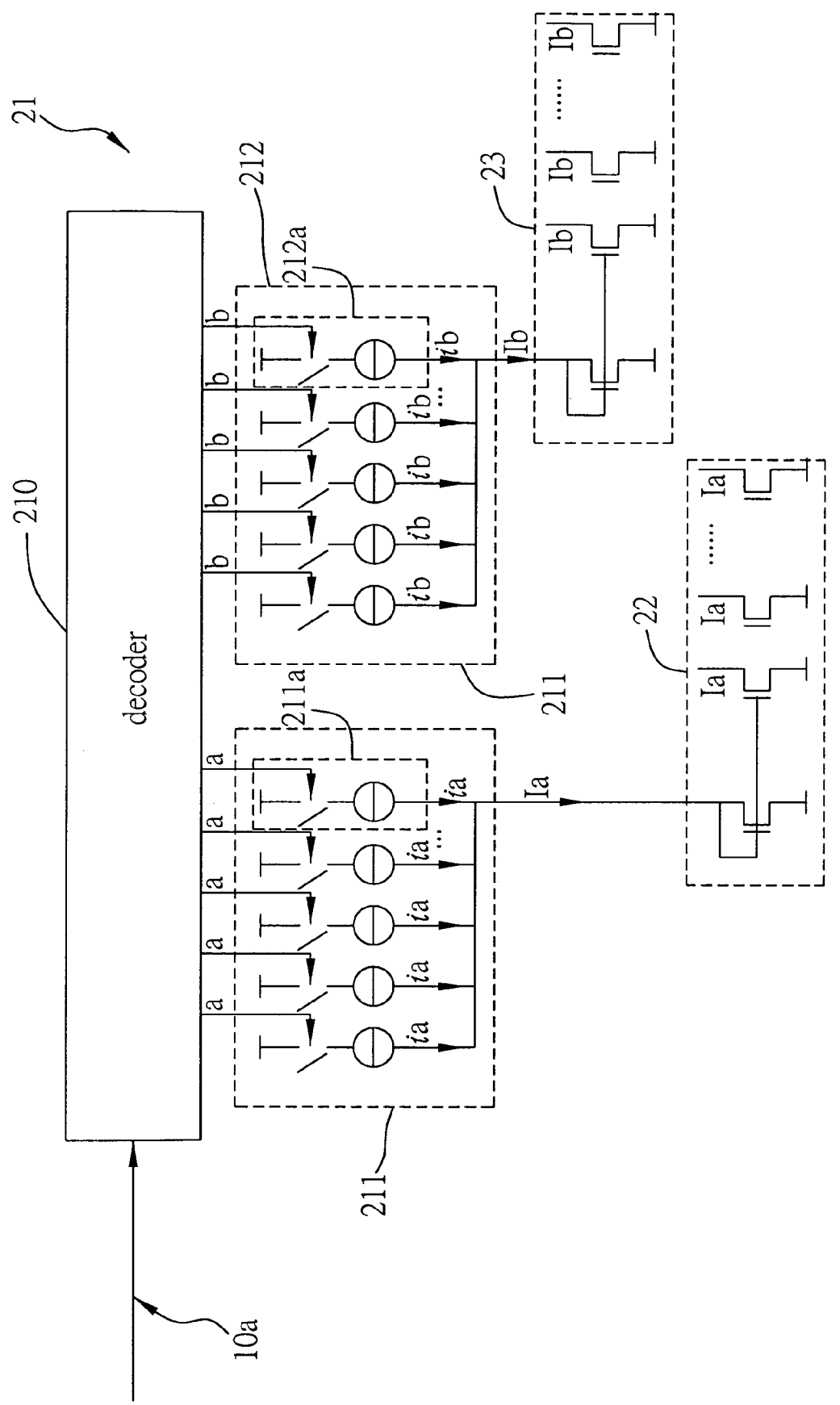
FIG. 3 (A) shows a schematic internal circuit diagram of a current source generating unit shown in FIG. 2.

The internal circuit structure of the above-mentioned current source generating unit 21 is shown in FIG. 3(A). As shown, a decoder 210 of the current source generating unit 21 is used to process the control command outputted from the transmission control unit 1, such as the multi-bit control command previously described (labelled as d in this embodiment), to generate a plurality of control signals a and a plurality of control signals b. A current generating array 211 is consisted of a plurality of current generating sub-unit 211a of the current source generating unit 21. These current generating sub-unit 211a corresponds to a respective control signal a, such that each of the on/off status of the sub-units 211a is controlled by the respective control signal a in order to create the current source Ia for use by the first-mode converting unit 22. A current generating array 212 is consisted of a plurality of current generating sub-unit 212a of the current source generating unit 21. These current generating sub-unit 212a corresponds to a respective control signal b, such that each of the on/off status of the sub-units 212a is controlled by the respective control signal b in order to create the current source Ib for use by the second-mode converting unit 23. The number of these current generating sub-units 211a and 211b depends on the actual applications. Each current generating sub-units 211a and 211b is for example consisted of a transistor (not shown). When it is turned on, a corresponding characteristic current (ia, ib) is outputted, which is proportional to the area ratio (width/length ratio) of the transistor. In this embodiment, the magnitude of the current source Ia can be controlled by controlling the number (n1) of current generating sub-unit 211a that are turned on:

$$Ia = n1 \times ia \quad (Eq.1)$$

While the magnitude of the current source Ib can be controlled by controlling the number(n2) of current generating sub-unit 212a that are turned on:

$$Ib = n2 \times ib \quad (Eq.2)$$

Therefore, current sources Ia and Ib compatible with the transmission standard adopted by the network apparatus can be provided by the current source generating unit 21, thereby selecting the appropriate data conversion mode (first mode and/or second mode) according to the magnitudes of these current sources Ia and Ib in order to achieve power saving and/or anti-EMI effects.

In addition, the data transmission device of the present invention can adjust the magnitude of the current sources Ia and Ib by controlling the number of current generating sub-units 211a and 211b that are turned on in the current source generating unit 21. This meets the output voltage swings requirement for the various different types of transmission standards adopted by the network apparatus, eliminating the shortcomings of increased design cost and complexity for having to add extra line driver units to satisfy larger output signal swing (e.g. 2.5 V output voltage swing is required by the 10Base-T transmission standard) in the prior art.

Figure 3B:
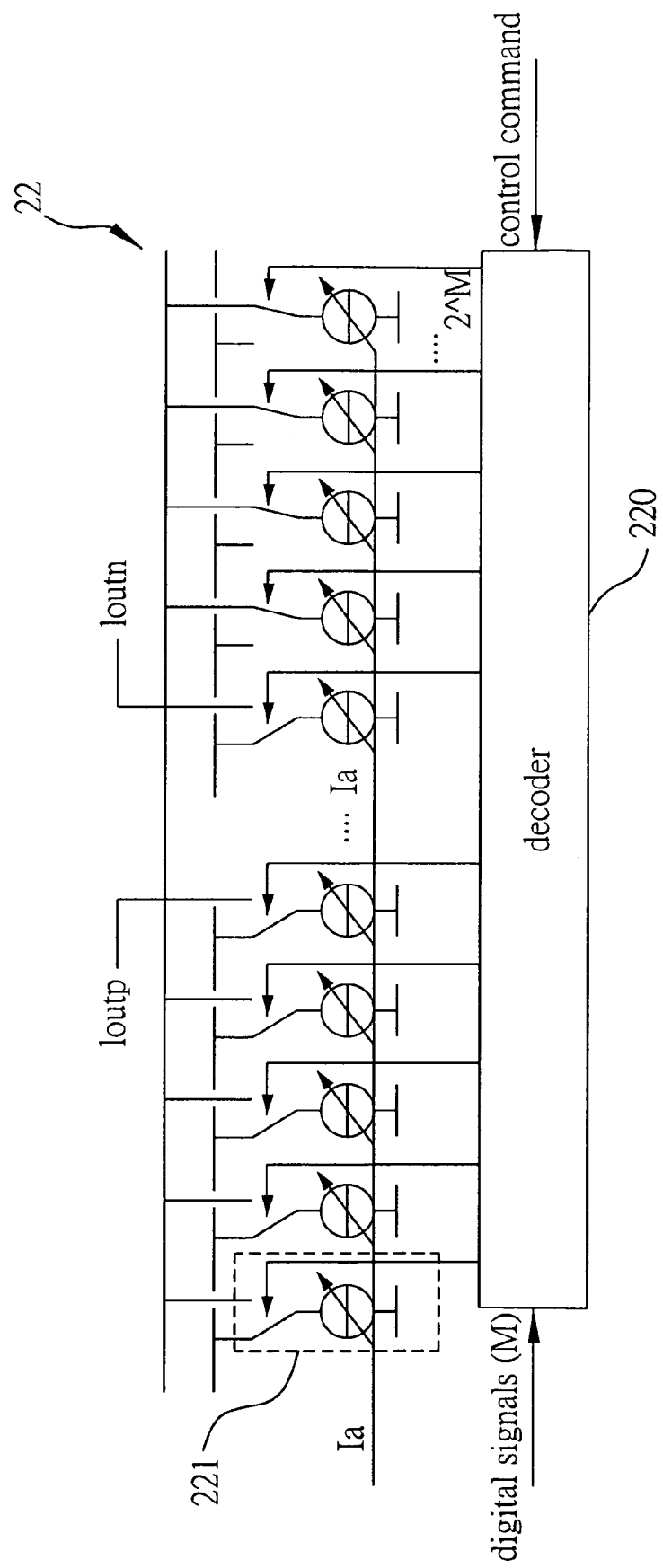

The internal circuit structure of the above-mentioned first-mode converting unit 22 (i.e. the M-bit Class A DAC) is shown in FIG. 3(B). As shown, a decoder 220 of the first-mode converting unit 22 is used to process the digital signals (e.g. 5-bit digital signals) generated by the signal adjusting unit 20 and generate a plurality of (e.g.$2^M$) control signals when the first-mode converting unit 22 is enabled (as described above). A plurality of current transmitting units 221 (i.e. line driver cells) are used to output the inputted current source Ia to an output positive end Ioutp or an output negative end Ioutn under the control of the decoder 220. Each of these current transmitting units 221 corresponds a respective control signal, so that the output path (output positive end Ioutp or output negative end Ioutn) of the corresponding current transmitting unit 221 is controlled by the control signal. When the differential-mode current output is zero, the outputs of half of these current transmitting units 221 are connected with the output positive end (Ioutp), while the outputs of the other half of these current transmitting units 221 are connected with the output negative end (Ioutn).

Since different transmission standards requires different output voltage swings, for example, peak values of the output voltage for a 1000Base-T transmission standard are +/− 1 V with 17 voltage steps, and voltage value of each step is 0.125 V; peak values of the output voltage for a 100Base-T transmission standard are +/− 1 V with 3 voltage steps, and voltage value of each step is 1 V; peak values of the output voltage for a 10Base-T transmission standard are +/− 2.5 V with 2 voltage steps, and voltage value of each step is 2.5 V. In order to meet the requirements of the transmission standards, digital data outputted must be at least a 5-bit digital signal. Now for example if the digital signal is a 5-bit digital signal, current source Ia provided by the current source generating unit 21 is 2.5 mA, and the number of current transmitting units is 16, then the values of the output signals (Ioutp and Ioutn) generated by the first mode (i.e. Class A mode) are shown in Table 1 below:

| B4 | b3 | b2 | b1 | b0 | c16 | c15 | c14 | c13 | c12 | c11 | c10 | c9 | c8 | c7 | c6 | c5 | c4 | c3 | c2 | c1 | Ioutn | Ioutp |
|----|----|----|----|----|-----|-----|-----|-----|-----|-----|-----|----|----|----|----|----|----|----|----|----|-------|-------|
| 0 | 0 | 0 | 0 | 0 | 0 | 0 | 0 | 0 | 0 | 0 | 0 | 0 | 0 | 0 | 0 | 0 | 0 | 0 | 0 | 1 | 40 mA | 0 mA |
| 0 | 0 | 0 | 0 | 1 | 0 | 0 | 0 | 0 | 0 | 0 | 0 | 0 | 0 | 0 | 0 | 0 | 0 | 0 | 0 | 1 | 37.5 mA | 2.5 mA |
| 0 | 0 | 0 | 1 | 0 | 0 | 0 | 0 | 0 | 0 | 0 | 0 | 0 | 0 | 0 | 0 | 0 | 0 | 0 | 1 | 1 | 35 mA | 5 mA |
| 0 | 0 | 0 | 1 | 1 | 0 | 0 | 0 | 0 | 0 | 0 | 0 | 0 | 0 | 0 | 0 | 0 | 0 | 1 | 1 | 1 | 32.5 mA | 7.5 mA |
| 0 | 0 | 1 | 0 | 0 | 0 | 0 | 0 | 0 | 0 | 0 | 0 | 0 | 0 | 0 | 0 | 0 | 1 | 1 | 1 | 1 | 30 mA | 10 mA |
| 0 | 0 | 1 | 0 | 1 | 0 | 0 | 0 | 0 | 0 | 0 | 0 | 0 | 0 | 0 | 0 | 1 | 1 | 1 | 1 | 1 | 27.5 mA | 12.5 mA |
| 0 | 0 | 1 | 1 | 0 | 0 | 0 | 0 | 0 | 0 | 0 | 0 | 0 | 0 | 0 | 1 | 1 | 1 | 1 | 1 | 1 | 25 mA | 15 mA |
| 0 | 0 | 1 | 1 | 1 | 0 | 0 | 0 | 0 | 0 | 0 | 0 | 0 | 0 | 1 | 1 | 1 | 1 | 1 | 1 | 1 | 22.5 mA | 17.5 mA |
| 0 | 1 | 0 | 0 | 0 | 0 | 0 | 0 | 0 | 0 | 0 | 0 | 0 | 1 | 1 | 1 | 1 | 1 | 1 | 1 | 1 | 20 mA | 20 mA |
| 0 | 1 | 0 | 0 | 1 | 0 | 0 | 0 | 0 | 0 | 0 | 0 | 1 | 1 | 1 | 1 | 1 | 1 | 1 | 1 | 1 | 17.5 mA | 22.5 mA |
| 0 | 1 | 0 | 1 | 0 | 0 | 0 | 0 | 0 | 0 | 0 | 1 | 1 | 1 | 1 | 1 | 1 | 1 | 1 | 1 | 1 | 15 mA | 25 mA |
| 0 | 1 | 0 | 1 | 1 | 0 | 0 | 0 | 0 | 0 | 1 | 1 | 1 | 1 | 1 | 1 | 1 | 1 | 1 | 1 | 1 | 12.5 mA | 27.5 mA |
| 0 | 1 | 1 | 0 | 0 | 0 | 0 | 0 | 0 | 1 | 1 | 1 | 1 | 1 | 1 | 1 | 1 | 1 | 1 | 1 | 1 | 10 mA | 30 mA |
| 0 | 1 | 1 | 0 | 1 | 0 | 0 | 0 | 1 | 1 | 1 | 1 | 1 | 1 | 1 | 1 | 1 | 1 | 1 | 1 | 1 | 7.5 mA | 32.5 mA |
| 0 | 1 | 1 | 1 | 0 | 0 | 0 | 1 | 1 | 1 | 1 | 1 | 1 | 1 | 1 | 1 | 1 | 1 | 1 | 1 | 1 | 5 mA | 35 mA |
| 0 | 1 | 1 | 1 | 1 | 0 | 1 | 1 | 1 | 1 | 1 | 1 | 1 | 1 | 1 | 1 | 1 | 1 | 1 | 1 | 1 | 2.5 mA | 37.5 mA |
| 1 | 0 | 0 | 0 | 0 | 1 | 1 | 1 | 0 | 1 | 1 | 1 | 1 | 1 | 1 | 1 | 1 | 1 | 1 | 1 | 1 | 0 mA | 40 mA |

As can be seen in Table 1 above, the common-mode output current of the first (i.e. Class A mode) is Ioutc=Ioutp+Ioutn=40 mA, which is a constant value. when the current transmitting units 221 are working in the first mode, it is more power-consuming but with less EMI. Differential-mode current (Ioutd=Ioutp−Ioutn) varies between +40 mA and −40 mA. In areas where network apparatus density is large, EMI is a first-priority issue to be solved. Thus, the current operating status of the network apparatus can be met by appropriate mode selection, that is, enabling the first mode and disabling the second mode by the control command 10a or the current sources generated by the current source generating unit 21. For 1000/100Base-T transmission standards where output voltage peak value is +/− 1 V (output voltage= Ioutd*Rout/4 mV, where Rout is 100 Ω in this embodiment), the required output current is thus 40 mA, which can be obtained by turning on all 16 current transmitting units 221 in the same direction (Ioutp or Ioutn) controlled by the control signals by the decoder to output a current of 16*2.5 mA=40 mA.

Figure 3C:
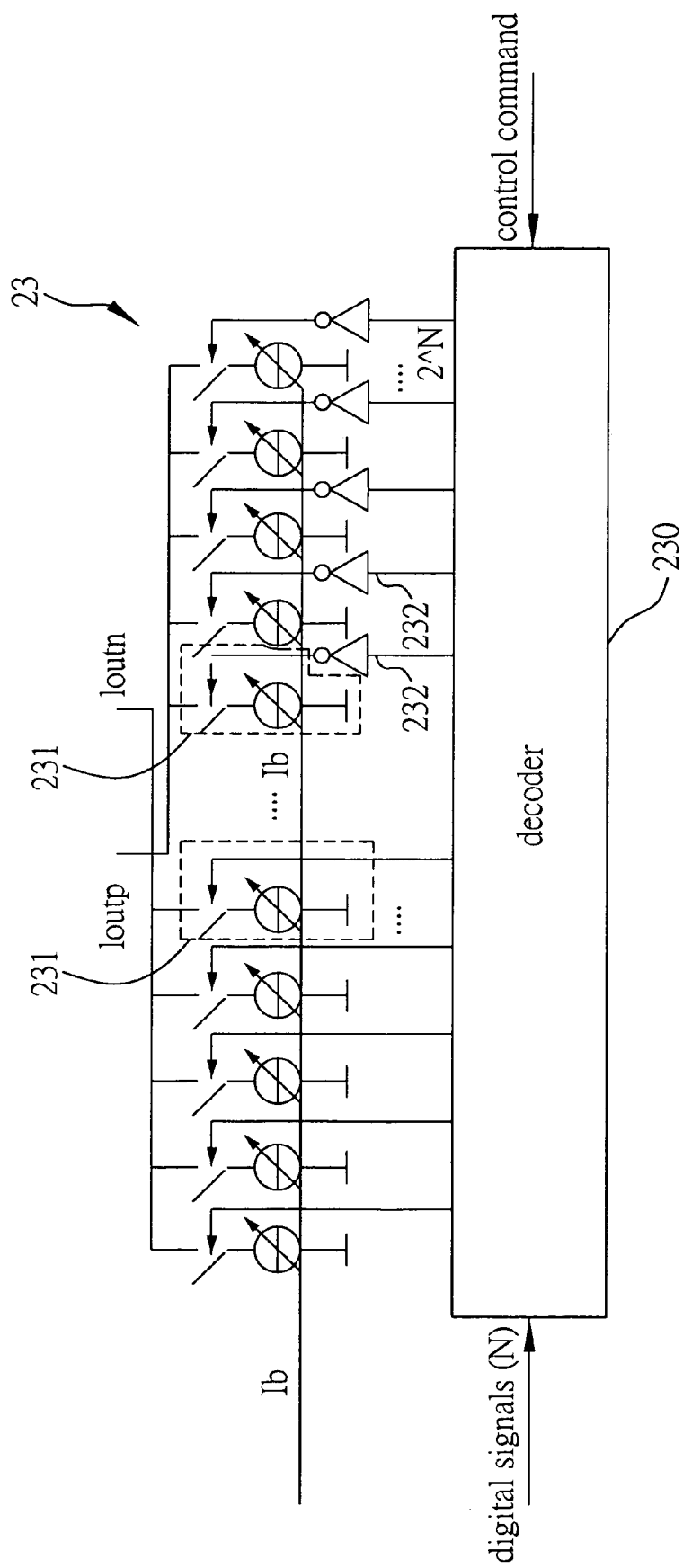

The internal circuit structure of the above-mentioned second-mode converting unit 23 (i.e. the N-bit Class B DAC) is shown in FIG. 3(C). As shown, a decoder 230 of the second-mode converting unit 23 is used to process the N-bit digital signals and generate a plurality of (e.g. $2^N$) control signals when the second-mode converting unit 23 is enabled. A plurality of current transmitting units 231 are used to output the inputted current source Ib. A plurality of inverters 232 are connected to the decoder 230 to invert a portion of the control signals outputted by the decoder 230 in order to properly control the connected current transmitting units 231. In this embodiment, each of these current transmitting units 231 corresponds a respective control signal, so that the on/off status of the current transmitting units 231 can be controlled by the respectively connected control signals from the decoder 230 or inverters 232. Half of the current transmitting units 231 are directly connected to the decoder 230, the output signals of these current transmitting units 231 are connected to output negative ends (Ioutn), while the other half of the current transmitting units 231 are connected to the decoder 230 via the respective inverters 232, the output signals of these current transmitting units 231 are connected to output positive ends (Ioutp).

Now for example if the digital signal is a 5-bit digital signal, the current source Ib provided by the current source generating unit 21 is 7.5 mA, and the number of current transmitting units is 16, then the values of the output signals (Ioutp and Ioutn) generated through the second mode (i.e. Class B mode) are shown in Table 2 below:

sion control unit 1, where the total output current is 100 mA=60 mA+40 mA, and the output voltage is 100 mA*100Ω/4=2.5 V.

Figure 4:
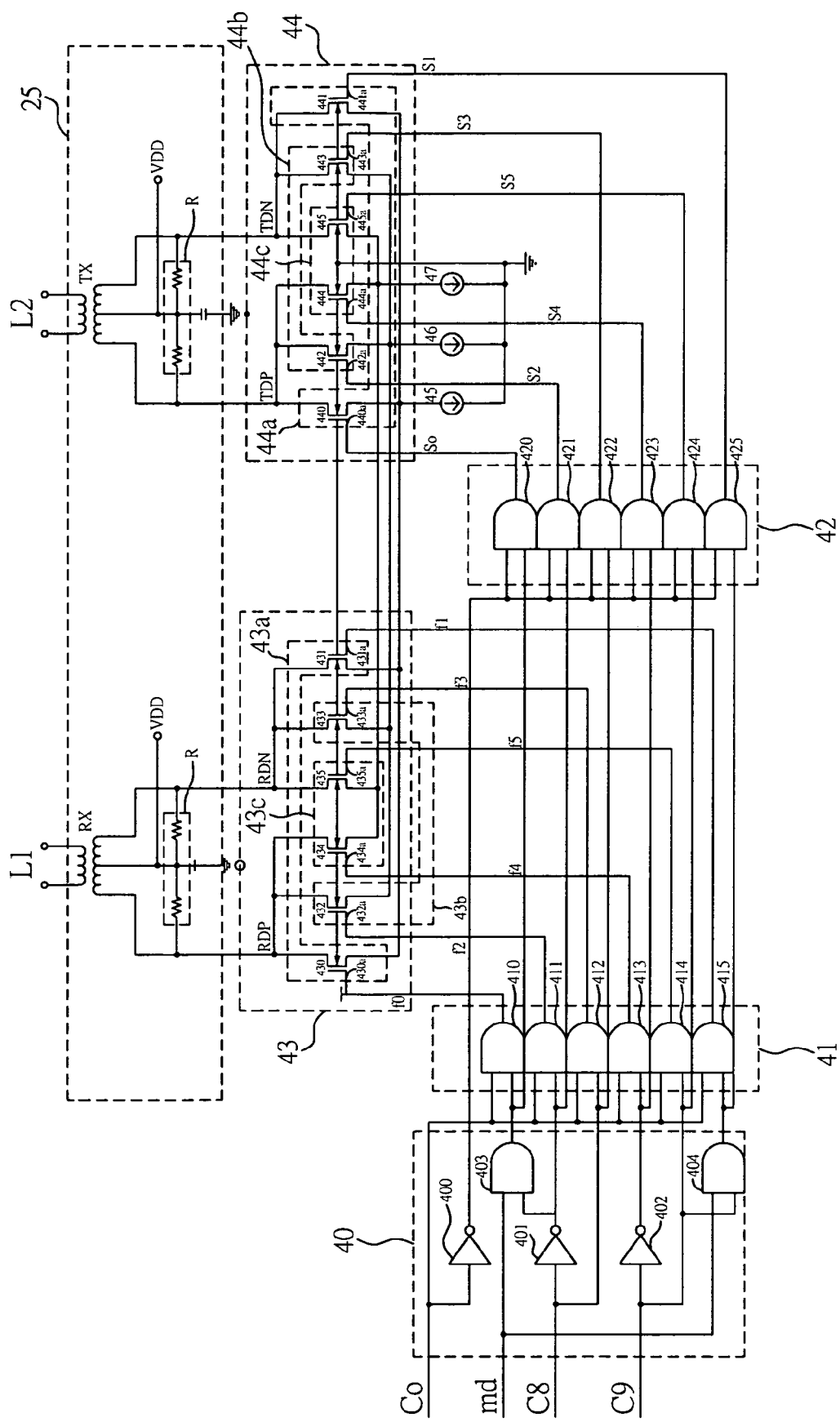
FIG. 4 is a schematic circuit diagram of the data transmission device constructed according to the current transmitting units of the present invention.

The basic circuit structure of a current transmitting unit (i.e. a current transmitting unit 221 or 231 described above) of the data transmission device 2 of the present invention is shown in FIG. 4. The network apparatus is assumed to adopt a 10Base-T transmission standard. The description will be given in combination to Table 1 and Table 2 (wherein C8 and C9 constitutes a set of control signals, C7 and C10 constitutes a set of control signals, C6 and C11 constitutes a set of control signals, C5 and C12 constitutes a set of control signals, C4 and C13 constitutes a set of control signals, C3 and C14 constitutes a set of control signals, C2 and C15 constitutes a set of control signals, C1 and C16 constitutes a set of control signals). In this embodiment, the current transmitting unit (221, 231) is controlled by the set of control signals constituted by C8 and C9. As shown in FIG. 4, the current transmitting unit (221, 231) includes: control logics 40, 41 and 42 and switching circuits 43 and 44.

The control logic 40 includes inverters 400, 401 and 402 and AND gates 403 and 404. As shown, input of the inverter 400 is a crossover signal Co (which is generated by the transmission control unit 1 according to the status of the network apparatus); input of the inverter 402 is the control signal C8; input of the inverter 402 is the control signal C9; input of the AND gate 403 is a 10M-mode signal md, output signal of the inverter 401 is $\overline{C8}$; input of the AND gate 404 is the control signal C9 and the signal md.

| B4 | b3 | b2 | b1 | b0 | c16 | c15 | c14 | c13 | c12 | c11 | c10 | c9 | c8 | c7 | c6 | c5 | c4 | c3 | c2 | c1 | Ioutn | Ioutp |
|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 1 | 60 mA | 0 mA |
| 0 | 0 | 0 | 0 | 1 | 0 | 0 | 0 | 0 | 0 | 0 | 0 | 0 | 0 | 0 | 0 | 0 | 0 | 0 | 0 | 1 | 52.5 mA | 0 mA |
| 0 | 0 | 0 | 1 | 0 | 0 | 0 | 0 | 0 | 0 | 0 | 0 | 0 | 0 | 0 | 0 | 0 | 0 | 0 | 1 | 1 | 45 mA | 0 mA |
| 0 | 0 | 0 | 1 | 1 | 0 | 0 | 0 | 0 | 0 | 0 | 0 | 0 | 0 | 0 | 0 | 0 | 0 | 1 | 1 | 1 | 37.5 mA | 0 mA |
| 0 | 0 | 1 | 0 | 0 | 0 | 0 | 0 | 0 | 0 | 0 | 0 | 0 | 0 | 0 | 0 | 0 | 1 | 1 | 1 | 1 | 30 mA | 0 mA |
| 0 | 0 | 1 | 0 | 1 | 0 | 0 | 0 | 0 | 0 | 0 | 0 | 0 | 0 | 0 | 0 | 1 | 1 | 1 | 1 | 1 | 22.5 mA | 0 mA |
| 0 | 0 | 1 | 1 | 0 | 0 | 0 | 0 | 0 | 0 | 0 | 0 | 0 | 0 | 0 | 1 | 1 | 1 | 1 | 1 | 1 | 15 mA | 0 mA |
| 0 | 0 | 1 | 1 | 1 | 0 | 0 | 0 | 0 | 0 | 0 | 0 | 0 | 0 | 1 | 1 | 1 | 1 | 1 | 1 | 1 | 7.5 mA | 0 mA |
| 0 | 1 | 0 | 0 | 0 | 0 | 0 | 0 | 0 | 0 | 0 | 0 | 0 | 1 | 1 | 1 | 1 | 1 | 1 | 1 | 1 | 0 mA | 0 mA |
| 0 | 1 | 0 | 0 | 1 | 0 | 0 | 0 | 0 | 0 | 0 | 0 | 1 | 1 | 1 | 1 | 1 | 1 | 1 | 1 | 1 | 0 mA | 7.5 mA |
| 0 | 1 | 0 | 1 | 0 | 0 | 0 | 0 | 0 | 0 | 0 | 1 | 1 | 1 | 1 | 1 | 1 | 1 | 1 | 1 | 1 | 0 mA | 15 mA |
| 0 | 1 | 0 | 1 | 1 | 0 | 0 | 0 | 0 | 0 | 1 | 1 | 1 | 1 | 1 | 1 | 1 | 1 | 1 | 1 | 1 | 0 mA | 22.5 mA |
| 0 | 1 | 1 | 0 | 0 | 0 | 0 | 0 | 0 | 1 | 1 | 1 | 1 | 1 | 1 | 1 | 1 | 1 | 1 | 1 | 1 | 0 mA | 30 mA |
| 0 | 1 | 1 | 0 | 1 | 0 | 0 | 0 | 1 | 1 | 1 | 1 | 1 | 1 | 1 | 1 | 1 | 1 | 1 | 1 | 1 | 0 mA | 37.5 mA |
| 0 | 1 | 1 | 1 | 0 | 0 | 0 | 1 | 1 | 1 | 1 | 1 | 1 | 1 | 1 | 1 | 1 | 1 | 1 | 1 | 1 | 0 mA | 45 mA |
| 0 | 1 | 1 | 1 | 1 | 0 | 1 | 1 | 1 | 1 | 1 | 1 | 1 | 1 | 1 | 1 | 1 | 1 | 1 | 1 | 1 | 0 mA | 52.5 mA |
| 1 | 0 | 0 | 0 | 0 | 1 | 1 | 1 | 0 | 1 | 1 | 1 | 1 | 1 | 1 | 1 | 1 | 1 | 1 | 1 | 1 | 0 mA | 60 mA |

As can be seen in Table 2 above, the common-mode output current is variable between 0 and 60 mA). Variable common-mode output signals will cause greater EMI and distortion, but the problem of power consumption is not severe. In regions where network apparatus density is lower, the EMI is a secondary issue to be solved, while the power consumption may be the first issue. Thus, the current operating status of the network apparatus can be satisfied by selecting appropriate modes, that is, the first mode being disabled while the second mode being enabled by control command 10a or current sources generated by the current source generating unit 21.

For places where network apparatus density is medium, a hybrid of first and second modes can be selected. For example, the 10Base-T standard can be met by enabling both the first- and second-mode converting units by the transmis- The control logic 41 includes AND gates 410, 411, 412, 413, 414 and 415. As shown, input of the AND gate 410 is the crossover signal Co and the output signal md·$\overline{C8}$ of the AND gate 403; input of the AND gate 411 is the crossover signal Co and the output signal $\overline{C8}$ of the inverter 401; input of the AND gate 412 is the crossover signal Co and the control signal C8; input of the AND gate 413 is the crossover signal Co and the output signal $\overline{C9}$ of the inverter 402; input of the AND gate 414 is the crossover signal Co and the control signal C9; input of the AND gate 415 is the crossover signal Co and the output signal md·C9 of the AND gate 404.

The control logic 42 includes AND gates 420, 421, 422, 423, 424 and 425. As shown, input of the AND gate 420 is the output signal $\overline{Co}$ of the inverter 400 and the output signal md·$\overline{C8}$ of the AND gate 403; input of the AND gate 421 is the output signal $\overline{Co}$ of the inverter 400 and the output signal C8 of the inverter 401; input of the AND gate 422 is the output signal $\overline{Co}$ of the inverter 400 and the control signal C8; input of the AND gate 423 is the output signal $\overline{Co}$ of the inverter 400 and the output signal $\overline{C9}$ of the inverter 402; input of the AND gate 424 is the output signal $\overline{Co}$ of the inverter 400 and the control signal C9; input of the AND gate 425 is the output signal $\overline{Co}$ of the inverter 400 and the output signal md·C9 of the AND gate 404.

The switching circuit 43 acts as an input receiving end (RX) under normal circumstances, which comprises FETs 430 and 431 constituting switch 43a, FETs 432 and 433 constituting switch 43b and FETs 434 and 435 constituting switch 43c. The sources of the FETs 430 and 431 are connected with a current source 45 of current sources (designated by 45, 46 and 47 in this embodiment) provided by the current source generating unit 21; the gates 430a and 431a of the FETs 430 and 431 are connected to output ends of the AND gates 410 and 415, respectively, so that the gates of the FETs 430 and 431 are controlled by the output signals md·$\overline{C8}$·Co and md·$\overline{C9}$·Co of AND gates 410 and 415, respectively. That is, the control signals for gates 430a and 431a are:

$$f0 = md \cdot \overline{C8} \cdot Co \quad \text{(Eq.3)}$$

$$f1 = md \cdot \overline{C9} \cdot Co \quad \text{(Eq.4)}$$

The sources of FETs 432 and 433 are connected to the current source 46, the gates 432a and 433a of the FETs 432 and 433 are connected to the output ends of the AND gates 411 and 412, respectively, so that the gates 432a and 433a of the FETs 432 and 433 are controlled by the output signals $\overline{C8}$·Co and C8·Co of the AND gates 411 and 412, respectively. That is, the control signals for the gates 432a and 433a are:

$$f2 = \overline{C8} \cdot Co \quad \text{(Eq.5)}$$

$$f3 = C8 \cdot Co \quad \text{(Eq.6)}$$

The sources of FETs 434 and 435 are connected to the current source 47, the gates 434a and 435a of the FETs 434 and 435 are connected to the output ends of the AND gates 413 and 414, respectively, so that the gates 434a and 435a of the FETs 434 and 435 are controlled by the output signals $\overline{C9}$·Co and C9·Co of the AND gates 413 and 414, respectively. That is, the control signals for the gates 434a and 435a are:

$$f4 = \overline{C9} \cdot Co \quad \text{(Eq.7)}$$

$$f5 = C9 \cdot Co \quad \text{(Eq.8)}$$

The drains of the FETS 430, 432 and 434 are connected with the receiving data positive end (RDP); the drains of the FETS 431, 433 and 435 are connected with the receiving data negative end (RDN). The receiving data positive end RDN and the receiving data negative end RDN can be connected to a transmission medium (transmission line L1 in this embodiment) via above-mentioned line interface 25. In this embodiment, these FETs are N-channel FETs.

Figure 5:
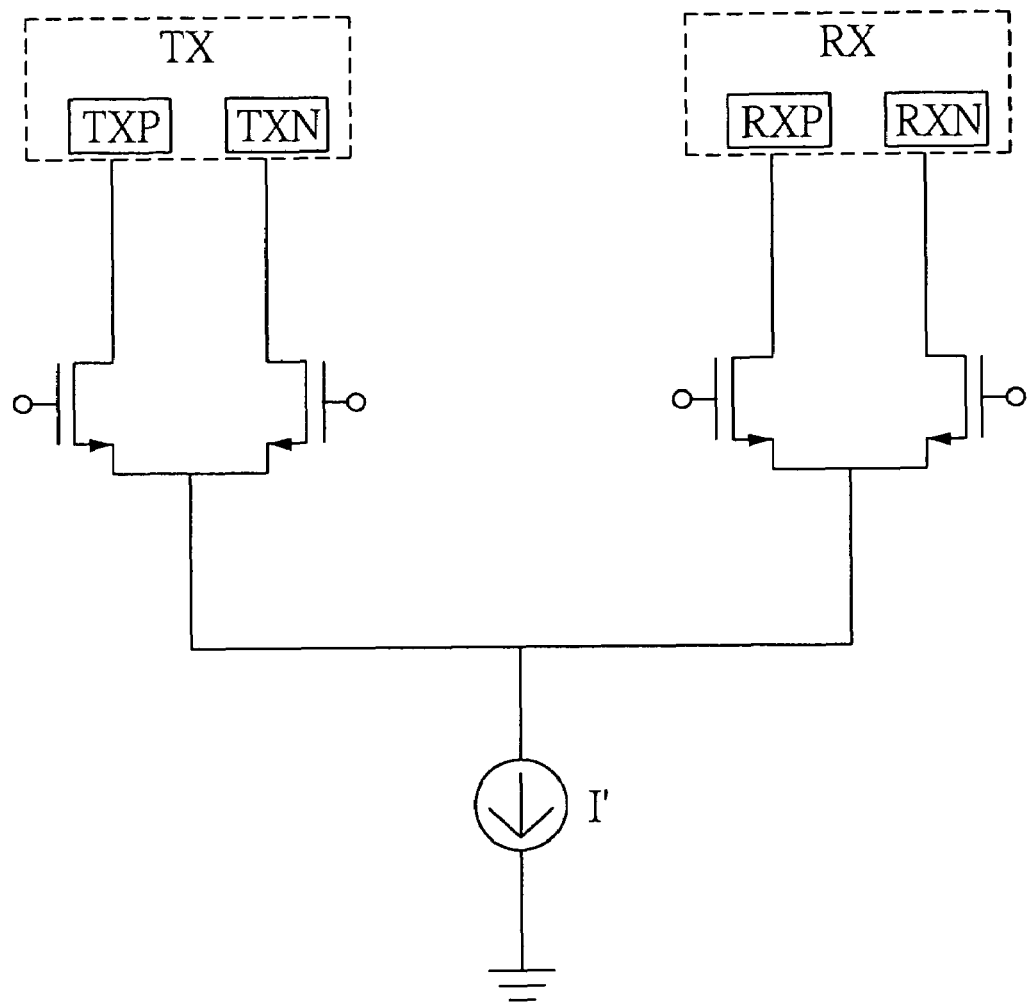
FIG. 5 shows a duplicate switch structure that is constituted by the current transmitting units shown in FIG. 4.

The switching circuit 44 acts as a signal transmitting end (TX), the structure thereof is exactly the same with that of the switching circuit 43, which constitutes a duplicate current switch structure as shown in FIG. 5, where TX and RX shares the same current source I'. Referring back to FIG. 4, FETs 440 and 441 constitute switch 44a, FETs 442 and 443 constitute switch 44b and FETs 444 and 445 constitute switch 44c. The sources of the FETs 440 and 441 are connected with the current source 45; the gates 440a and 441a of the FETs 440 and 441 are connected to output ends of the AND gates 420 and 425, respectively, so that the gates of the FETs 440 and 441 are controlled by the output signals md·$\overline{C8}$·Co and md·C9·$\overline{Co}$ of AND gates 420 and 425, respectively. That is, the control signals for gates 440a and 441a are:

$$S0 = md \cdot \overline{C8} \cdot \overline{Co} \quad \text{(Eq.9)}$$

$$S1 = md \cdot C9 \cdot \overline{Co} \quad \text{(Eq.10)}$$

The sources of FETs 442 and 443 are connected to the current source 46, the gates 442a and 443a of the FETs 442 and 443 are connected to the output ends of the AND gates 421 and 422, respectively, so that the gates 442a and 443a of the FETs 442 and 443 are controlled by the output signals $\overline{C8}$·$\overline{Co}$ and C8·$\overline{Co}$ of the AND gates 421 and 422, respectively. That is, the control signals for the gates 442a and 443a are:

$$S2 = \overline{C8} \cdot \overline{Co} \quad \text{(Eq.11)}$$

$$S3 = C8 \cdot \overline{Co} \quad \text{(Eq.12)}$$

The sources of FETs 444 and 445 are connected to the current source 47, the gates 444a and 445a of the FETs 444 and 445 are connected to the output ends of the AND gates 423 and 424, respectively, so that the gates 444a and 445a of the FETs 444 and 445 are controlled by the output signals $\overline{C9}$·$\overline{Co}$ and C9·$\overline{Co}$ of the AND gates 423 and 424, respectively. That is, the control signals for the gates 444a and 445a are:

$$S4 = \overline{C9} \cdot \overline{Co} \quad \text{(Eq.13)}$$

$$S5 = C9 \cdot \overline{Co} \quad \text{(Eq.14)}$$

The drains of the FETS 440, 442 and 444 are connected with the transmitting data positive end (TDP); the drains of the FETS 441, 443 and 445 are connected with the transmitting data negative end (TDN). The transmitting data positive end TDN and the transmitting data negative end TDN can be connected to a transmission medium (transmission line L2 in this embodiment) via above-mentioned line interface 25. In this embodiment, these FETs are N-channel FETs.

It can be seen from Table 1 and Table 2 that if a positive voltage is to be outputted, and when control signal C8=0 and control signal C9=0, and assuming 10M-mode transmitting signal md=1, crossover signal Co=1, then from the above equations (Eqs. 3~14) it can be seen that RX end control signal f0=f2=f4=1, and the rest of control signals f1, f3 and f5 are zero. At this time, FETs 430, 432 and 434 are turned on, current source signals can then be converted into output voltage via these FETs 430, 432 and 434 and output resistors R, and the output voltage is outputted via the transmission line L1 selected by the line interface 25.

As for the TX end, it can be derived from the above equations, when crossover signal=1, all the control signals (S0, S1, S2, S3, S4 and S0) are zero, which makes the switches 44a, 44b and 44c of the TX end effectively turned off from transmitting signals. This would eliminate the event of unable to transmit and receive signals due to wrong connections of lines at the TX and RX ends. In this embodiment, the current source signals are transmit through one-stage MOSFET switches, thus eliminating the problem of signal losses due to the current source signals having to pass through multi-stages switches in the prior art.

It should be noted that the above-described electrical components and circuit structures can be replaced by other electrical components and circuit structures with similar or the same functions depending on actual applications.

Compared to the prior art, data transmission device of the present invention can be automatically and instantaneously switched to a selected data processing mode of current operation status of the network apparatus by the current source generating unit 21 generating current source signals according to the control commands 10a of the transmission control unit 1.

Meanwhile, the current source generating unit 21 in the data transmission device of the present invention generates current source signals compatible with the type of transmission standard adopted by the network apparatus according to the transmission control unit 1, so as to allow the first-mode and second-mode converting units (22 and 23) to convert digital signals to be transmitted into analog signals compatible with the transmission standard according to the current source signals and/or the control commands 10a of the transmission control unit 1. Then the analog signals are transmitted via the transmission medium to the remote end, where the transmission medium is compatible with the configuration used by the network apparatus and is selected based on the automatic crossover function of the network apparatus by the line interface 25. The configuration is for example a node-mode or a hub-mode configuration. This avoids the need to add extra line driver units to satisfy the requirement for larger output voltage swing of the transmission standards (e.g. 10Base-T transmission standard), thereby reducing circuit design cost and complexity.

Moreover, in the data transmission device of the present invention, the first-mode and the second-mode converting units 22 and 23 are independently designed, so it provides greater flexibility for modifications of the design than that of the two-modes combined approach used in the prior art.

Additionally, in the current transmitting unit of the data transmission device of the present invention, the switching circuit is constituted by a plurality of MOSFETs as a one-stage switch, which avoids the current loss due to having to pas through multi-stages MOSFETs switches in the prior art.

Further, in the data transmission device of the present invention, the TX end and the RX end constitute a duplicate switch structure, such that signals can be transmitted from the TX end, and received at the RX end, or transmitted from the RX end, and received at the TX end, eliminating communication failure occurred in the case of circuit connection error.

The present invention has been described in detail by the above specific embodiments with reference of the drawings. Other advantages and effects will be readily appreciated by those skilled in the art via the detailed description disclosed in this specification. The present invention can be practiced by other embodiments, and should therefore cover various modifications and variations made to the herein-described details of the present invention, provided they fall within the scope of the present invention as defined in the following appended claims.

What is claimed is:

1. A data transmission device applied to a network apparatus having an automatic crossover function (MDI/MDIX) and connected with a transmission control unit, wherein the transmission control unit is capable of detecting an operating status of the network apparatus and generating a control command to the data transmission device, the data transmission device comprising:
    a signal adjusting unit for processing a digital data to be transmitted to generate a digital signal compatible with a transmission standard adopted by the network apparatus;
    a current source generating unit for outputting first current sources and second current sources compatible with the transmission standard adopted by the network apparatus according to the control command generated by the transmission control unit;
    a first-mode converting unit for converting the digital signal generated by the signal adjusting unit into a first analog signal according to the control command and the first current sources;
    a second-mode converting unit for converting the digital signal generated by the signal adjusting unit into a second analog signal according to the control command and the second current sources; and
    a summing unit for summing up the first analog signal and the second analog signal to generate a third analog signal representing the digital data to be transmitted and transmitted via a network medium to a remote end.

2. The data transmission device as claimed in claim 1, wherein the current source generating unit is a variable current source generator comprising:
    a decoder for decoding the control command generated by the transmission control unit to generate a plurality of control signals; and
    a plurality of current generating sub-units corresponding to the control signals generated by the decoder, respectively, such that the corresponding sub-unit is turned on or off by the respective control signal in order to generate the first current sources and the second current sources to the first-mode converting unit and the second-mode converting unit, respectively.

3. The data transmission device as claimed in claim 1, wherein the first-mode converting unit is a Class A Digital-to-Analog Converter (DAC) comprising:
    a decoder for decoding the digital signals generated by the signal adjusting unit to generate a plurality of control signals; and
    a plurality of current transmitting unit connected to the first current sources, respectively, and corresponding to the control signals generated by the decoder, respectively, so as to control output paths of the current transmitting units by the control signals to generate a first analog signal output.

4. The data transmission device as claimed in claim 1, wherein the second-mode converting unit is a Class B Digital-to-Analog Converter (DAC) comprising:
    a decoder for decoding the digital signals generated by the signal adjusting unit to generate a plurality of control signals; and
    a plurality of current transmitting unit connected to the second current sources, respectively, and corresponding to the control signals generated by the decoder, respectively, so as to control output paths of the current transmitting units by the control signals to generate a second analog signal output.

5. The data transmission device as claimed in claim 1, wherein the control command generated by the transmission control unit includes a two-bit control command and a multi-bit control command.

6. The data transmission device as claimed in claim 5, wherein a status value of the two-bit control command is determined by the transmission control unit based on the status of the network apparatus.

7. The data transmission device as claimed in claim 6, wherein the status value of the two-bit control command is one of four sets of binary values 00, 01, 10 and 11.

8. The data transmission device as claimed in claim 5, wherein the multi-bit control command is determined by the transmission control unit based on the type of transmission standard adopted by the network apparatus.

9. The data transmission device as claimed in claim 1, wherein the signal adjusting unit is a pulse shaping logic circuit.

10. The data transmission device as claimed in claim 1, wherein the transmission standard comprises a 10Base-T standard (10 MHz baseband transmission) standard, a 100Base-T standard (100 MHz baseband transmission) or a 1000Base-T (1000 MHz baseband transmission) standard.

11. The data transmission device as claimed in claim 1, further comprising a line interface for selecting a transmission medium compatible with the configuration adopted by the network apparatus based on the automatic crossover function of the network apparatus, thereby transmitting the third analog signal to the remote end via the transmission medium.

12. The data transmission device as claimed in claim 11, wherein the automatic crossover function is achieved by a duplicate switch to reduce energy loss and a requirement of operating voltage.

13. The data transmission device as claimed in claim 11, wherein the configuration adopted by the network apparatus is a mode selected from the group consisting of a node mode and a hub mode.

* * * * *

UNITED STATES PATENT AND TRADEMARK OFFICE
CERTIFICATE OF CORRECTION

PATENT NO. : 7,453,928 B2  Page 1 of 1
APPLICATION NO. : 11/270223
DATED : November 18, 2008
INVENTOR(S) : Ming-Chou Yen et al.

It is certified that error appears in the above-identified patent and that said Letters Patent is hereby corrected as shown below:

Title page, item (75) Inventors: should read as follows: Ming-Chou Yen, Hsin Chu (TW); Chun-Wang Wei, Hsin Chu (TW); Kun-Ying Tsai, Hsin Chu (TW); Jui-Tai Ko, Hsin Chu (TW)

Signed and Sealed this

Sixteenth Day of June, 2009

JOHN DOLL
*Acting Director of the United States Patent and Trademark Office*